United States Patent
Umkehrer et al.

(10) Patent No.: US 11,187,596 B2
(45) Date of Patent: Nov. 30, 2021

(54) APPARATUS FOR DETERMINING AND/OR MONITORING TEMPERATURE OF A MEDIUM

(71) Applicant: Endress+Hauser Wetzer GmbH+Co. KG, Nesselwang (DE)

(72) Inventors: Alfred Umkehrer, Hopferau (DE); Pavo Vrdoljak, Nesselwang (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 166 days.

(21) Appl. No.: 15/748,473

(22) PCT Filed: Jun. 28, 2016

(86) PCT No.: PCT/EP2016/064983
§ 371 (c)(1),
(2) Date: Jan. 29, 2018

(87) PCT Pub. No.: WO2017/016775
PCT Pub. Date: Feb. 2, 2017

(65) Prior Publication Data
US 2018/0224338 A1    Aug. 9, 2018

(30) Foreign Application Priority Data
Jul. 29, 2015    (DE) .............. 10 2015 112 426.2

(51) Int. Cl.
*G01K 15/00*    (2006.01)
*G01K 7/16*    (2006.01)
(52) U.S. Cl.
CPC ............ *G01K 15/005* (2013.01); *G01K 7/16* (2013.01)

(58) Field of Classification Search
CPC ...... G01K 15/00; G01K 15/005; G01K 17/08; G01K 15/002; G01K 13/00; G01K 13/02; G01K 3/04; G01K 7/183; G01K 7/16
See application file for complete search history.

(56) References Cited

U.S. PATENT DOCUMENTS 3,154,060 A * 10/1964 Hundere ................ G01K 1/08
123/434
3,612,963 A * 10/1971 Piper ................... H01G 4/2325
361/321.3

(Continued)

FOREIGN PATENT DOCUMENTS

| CN | 101556192 A | 10/2009 |
| CN | 204269258 U | 4/2015 |

(Continued)

OTHER PUBLICATIONS

Search Report for German Patent Application No. 10 2015 112 426.2, German Patent Office, dated Mar. 24, 2016, 5 pp.

(Continued)

*Primary Examiner* — Gail Kaplan Verbitsky
(74) *Attorney, Agent, or Firm* — Mark A. Logan; Endress+Hauser (USA) Holding Inc.

(57) ABSTRACT

The invention relates to an apparatus for determining and/or monitoring temperature of a medium, comprising at least one temperature sensor having at least one sensor element, an electronics unit, an input unit, and a display unit. The electronics unit is embodied to determine and/or to monitor at least the temperature of the medium and to detect whether the temperature sensor is immersed at least partially in at least one comparison medium with known comparison temperature. When the temperature sensor is immersed in a comparison medium the electronics unit performs a comparison measurement for calibrating and/or validating the (Continued)

sensor element. The temperature of the comparison medium is determined in the form of a comparison temperature measured value.

13 Claims, 2 Drawing Sheets

(56) References Cited

U.S. PATENT DOCUMENTS

| | | | | |
|---|---|---|---|---|
| 3,891,391 | A * | 6/1975 | Boone | G01F 1/68 73/204.18 |
| 4,156,887 | A * | 5/1979 | Tanguy | H01G 7/04 250/340 |
| 4,399,823 | A * | 8/1983 | Donnelly | A61B 5/01 374/163 |
| 4,722,611 | A * | 2/1988 | Hultgren | G01N 27/185 374/43 |
| 5,054,313 | A * | 10/1991 | Fitzgerald | G01N 11/16 73/54.27 |
| 5,601,363 | A * | 2/1997 | Keil | G01N 27/18 374/114 |
| 7,740,402 | B2 * | 6/2010 | Camp | G01F 1/699 374/45 |
| 9,091,601 | B2 * | 7/2015 | Schalles | G01K 15/002 |
| 10,794,775 | B2 * | 10/2020 | Umkehrer | G01K 7/38 |
| 2007/0206653 | A1 * | 9/2007 | Nakano | G01K 15/005 374/1 |
| 2010/0179397 | A1 * | 7/2010 | Bright | A61B 5/412 600/309 |
| 2014/0269812 | A1 * | 9/2014 | Deutscher | G01K 15/005 374/1 |
| 2015/0260667 | A1 * | 9/2015 | Isakov | G01N 25/72 374/5 |
| 2015/0285693 | A1 * | 10/2015 | Schalles | G01K 15/005 374/1 |
| 2016/0047699 | A1 * | 2/2016 | Seefeld | G01K 7/34 374/1 |
| 2018/0217010 | A1 * | 8/2018 | Umkehrer | G01K 7/38 |

FOREIGN PATENT DOCUMENTS

| | | | | |
|---|---|---|---|---|
| DE | 003145333 | A1 * | 5/1983 | |
| DE | 19941731 | A1 | 3/2001 | |
| DE | 102008047954 | B3 | 3/2010 | |
| DE | 102010040039 | A1 | 3/2012 | |
| EP | 1247268 | B2 | 10/2002 | |
| EP | 2359081 | A1 * | 8/2011 | F25D 31/003 |
| EP | 2863196 | A1 | 4/2015 | |
| EP | 3002356 | B1 * | 4/2017 | D06F 33/00 |

OTHER PUBLICATIONS

Search Report for International Patent Application No. PCT/EP2016/064983, WIPO, dated Sep. 12, 2016, 12 pp.

* cited by examiner

APPARATUS FOR DETERMINING AND/OR MONITORING TEMPERATURE OF A MEDIUM

CROSS-REFERENCE TO RELATED APPLICATIONS

The present application is related to and claims the priority benefit of German Patent Application No. 10 2015 112 426.2, filed on Jul. 29, 2015 and International Patent Application No. PCT/EP2016/064983 filed on Jun. 28, 2016, the entire contents of which are incorporated herein by reference.

TECHNICAL FIELD

The invention relates to an apparatus for determining and/or monitoring temperature of a medium, comprising at least one temperature sensor having at least one sensor element, and an electronics unit. Furthermore, the present invention relates to a method for calibrating and/or validating such an apparatus.

BACKGROUND

Thermometers are known from the state of the art in the most varied of embodiments. Thus, there are thermometers, which, for measuring temperature, use the expansion of a liquid, a gas or a solid with known coefficient of thermal expansion, or also such, which relate the electrical conductivity of a material with temperature, such as, for example, in the case of application of resistance elements or thermocouples. In contrast, in the case of pyrometers, the heat radiation of a substance is utilized for determining temperature. The various underpinning measuring principles have been described in a large number of publications.

The calibrating and/or validating of a thermometer is usually performed in calibration baths, in ovens or in fixed point systems. Such occurs then based on a comparison measurement in a comparison medium with a known comparison temperature, i.e. at a fixed, characteristic, temperature point, such as, for example, the triple point and/or melting point of a material. Alternatively, a calibrating and/or validating can also be performed based on a reference thermometer, for example, based on a platinum element calibrated based on the international standard, ITS-90.

Frequently applied as comparison medium is deionized ice water in a Dewar container. Advantageously in the case of this comparison medium, no complex cleaning of the measuring insert of the thermometer or the like is required following the comparison measurement. Thus, this characteristic temperature point is frequently utilized, in order to determine the so-called R0 value (R=100Ω at T=0° C.) of a resistance temperature sensor (RTD element for Resistance Temperature Detector) in the form of a platinum element according to the international standard, IEC60751, such as, for example, for a so-called PT100 element.

Usually for performing a comparison measurement, a thermometer must be removed from the respective process. There are, however, also apparatuses known, which enable an in situ calibrating and/or validating a thermometer, such as, for example, the miniaturized fixed point cell integrated in a thermometer, as described in DE 19941731 A1. Moreover, EP 1247268 B2 describes a method for in situ calibrating of temperature sensors of based on characteristic curves of one or more reference elements in the form of secondary temperature sensors with characteristic curves different from the temperature sensor. Similarly known from DE102010040039A1 is a thermometer with a reference element, by means of which an in situ calibrating can be performed based on a second order phase transition.

Independently thereof, whether a thermometer must be removed or not from a process for calibrating and/or validating, a comparison measurement must always be performed separately from the relevant process and the measured values taken for calibrating must, in given cases, be recorded in a calibration protocol. This requires a number of working steps on the part of the operating personnel.

Starting from the state of the art, an object of the present invention is to provide an apparatus for determining and/or monitoring temperature of a medium and a method for operation of such an apparatus, in order to enable an easily performable calibration and/or validation.

SUMMARY

This object is achieved according to the invention by an apparatus for determining and/or monitoring temperature of a medium, comprising at least one temperature sensor having at least one sensor element, and an electronics unit, wherein the electronics unit has at least one input unit at least for input of at least one comparison temperature of a comparison medium and/or at least one tolerance range for the at least one comparison temperature, and a display unit, wherein the electronics unit is embodied to determine and/or to monitor at least the temperature of the medium, and wherein the electronics unit is embodied to detect whether the temperature sensor is immersed at least partially in at least one comparison medium with known comparison temperature, and in the case, in which the temperature sensor is immersed in a comparison medium, to perform a comparison measurement for calibrating and/or validating the sensor element, in the case of which, based on a received signal received from the sensor element the temperature of the comparison medium is determined in the form of a comparison temperature measured value, and to indicate by means of the display unit the performing of the comparison measurement and/or the comparison temperature measured value.

The thermometer is thus advantageously able to detect whether at a given point in time a comparison measurement is performed and shows by means of the display unit the performing of the comparison measurement. It must thus only be assured that the comparison temperature and/or a tolerance range of the utilized comparison medium are furnished in the input unit. This data can, on the one hand, already be furnished in the manufacture of the thermometer, or input by the operating personnel at a later point in time. Depending on embodiment, these data can be activated once for a measuring or durably stored. Furthermore, an option is that likewise data for one or more comparison media are furnished, wherein in the latter case the relevant furnished values must be selected before performing the comparison measurement.

The thermometer must then only be immersed in the desired comparison medium. The measured value registering during the comparison measurement can occur automatically.

In an embodiment, the apparatus includes, furthermore, a memory unit, in which at least the at least one comparison temperature and/or the at least one tolerance range, and/or at least one comparison temperature measured value are storable, especially together with the associated comparison temperature. Preferably, these variables are stored together with an operation hours counter or a real time. In this way, the comparison temperature measured values taken in different comparative measurements over a longer period of time can be plotted automatically and systematically. This is an additional benefit for the operating personnel.

An embodiment includes that at least one algorithm is furnished in the electronics unit, and that based on the algorithm it is detected whether the temperature sensor is immersed in a comparison medium. By means of the algorithm, different temperature dependent variables can be calculated, or different variables ascertained from a temperature curve (i.e. the curve of temperature measured by means of the thermometer as a function of time), variables such as, for example, a slope of the temperature curve, or of a section of the temperature curve, the time required for reaching a stable comparison temperature measured value, or a temperature gradient. Especially, when a comparison medium with a characteristic comparison temperature is selected, which lies outside of the temperature range relevant during operation of the thermometer, there occurs at immersing the thermometer in the comparison medium at the immersion point in time a temperature jump in the direction of the comparison temperature. After this temperature jump there follows a flatter curve to the comparison temperature, and from a certain minimum difference between the comparison temperature, which is especially the theoretical characteristic value for these temperatures, and the current comparison temperature measured value, the comparison temperature measured value moves then asymptotically within a determined tolerance interval to the comparison temperature. These different sections of the curve can be taken into consideration, for example, for detecting the performing of a comparison measurement.

Since for many applications of temperature measurement, especially in the field of process- and/or automation technology, temperatures in the region of T=0° C. do not occur, deionized ice water in a Dewar container can especially preferably be selected as comparison medium, since this is especially easy to handle.

In an embodiment, the display unit is an optical interface, especially an LED or a display, or a digital interface. Also an optical interface, in the form, for example, of a display lamp, can be combined simultaneously with a display or a digital interface.

In a preferred embodiment, the electronics unit is embodied to ascertain the deviation of the comparison temperature measured value from the comparison temperature, and, in the case, in which the deviation exceeds a predeterminable limit value, to generate a report of such and/or to indicate such by means of the display unit and/or to furnish the deviation to the memory unit. If the deviation exceeds the predeterminable limit value, then it can be deduced that the thermometer no longer measures the temperature correctly. By additional storing of the deviation between the comparison temperature and the comparison temperature measured value, automatically a calibration protocol can be created, which then is queryable in the electronics unit.

Another embodiment provides that the electronics unit is embodied, for the case, in which the comparison temperature measured value lies outside a tolerance range, to generate a report of such and/or to indicate such by means of the display unit.

In an embodiment, the temperature sensor includes at least one reference element, which is manufactured at least partially of a material, which has at least one second order phase transition at a predetermined reference temperature. Especially involved, in such case, is one of the embodiments for a thermometer with such a reference element as described in DE102010040039A1.

In such case, advantageously, the reference element and the sensor element are arranged on at least one or at least two ceramic substrates metallized in the region of at least one face and thermally coupled via the metallizing, especially connected via a solder- or sinter process. In this way, a good heat transport can be achieved by means of heat conduction through the total temperature sensor, so that the sensor element and the reference element have on a short time scale no or only very small temperature differences. This relates especially to the point in time of the immersion in a comparison medium with a comparison temperature lying outside the temperature range relevant for the use of the thermometer.

Likewise, the electronics unit is advantageously embodied to perform a reference measurement by means of the at least one reference element, in the case of which the at least one phase transition is detected. Preferably, the at least one reference temperature is stored in the memory unit. The phase transition can be detected based on a change of a physical or chemical variable accompanying the phase transition, such as, for example, a change of the crystal structure, the volume and/or the dielectric, or electrical, properties of the material, from which the reference element is at least partially manufactured.

The object of the invention is, furthermore, achieved by a method for calibrating and/or validating an apparatus of the invention according to at least one the described embodiments, comprising method steps as follows:

detecting whether the temperature sensor is at least partially immersed in a comparison medium, performing a comparison measurement in the case, in which the temperature sensor is at least partially immersed in a comparison medium, determining the temperature of the comparison medium in the form of a comparison temperature measured value, and displaying the performing of a comparison measurement.

In an embodiment of the method, at least one known comparison temperature of at least one comparison medium and/or at least one tolerance range for at least one comparison temperature are/is stored.

In an embodiment, a comparison medium with a comparison temperature outside of the temperature range relevant for the apparatus is selected.

In an embodiment, it is detected based on an algorithm whether the temperature sensor is immersed in a comparison medium.

In an embodiment, comparison temperature measured values measured by means of the temperature sensor in predeterminable time intervals are plotted as a function of time in the form of a temperature curve, and/or a slope of the temperature curve or of a section of the temperature curve, the time required for reaching the comparison temperature measured value, or a temperature gradient is ascertained, especially in reference to a predeterminable time interval. Especially when a comparison medium with a characteristic comparison temperature is selected, which lies outside of the temperature range relevant during operation of the thermometer, there occurs at immersing of the thermometer in the comparison medium at the immersion point in time a temperature jump in the direction of the comparison temperature.

In an embodiment, the deviation of the comparison temperature measured value from the comparison temperature is determined.

In an additional embodiment of the method, a report is generated when the deviation exceeds a predeterminable limit value and/or when the comparison temperature measured value lies outside of the tolerance range.

In the case, in which the apparatus is a temperature sensor with at least one reference element, the object of the invention is achieved, furthermore, by a method for determining a reference temperature, comprising steps as follows:

immersing the temperature sensor in a first medium with a first temperature, which lies below the reference temperature, immersing the temperature sensor in a second medium with a second temperature, which lies above the reference temperature, registering, as a function of time, temperature measured values ascertained by means of the temperature sensor in defined time intervals, registering, as a function of time, a physical or chemical variable of the reference element accompanying the phase transition and undergoing a change at the reference temperature, ascertaining the reference point in time, at which the phase transition takes place, based on the change of the physical or chemical variable, and determining the deviation of the temperature measured value from the reference temperature at the reference point in time.

The embodiments explained with reference to the apparatus can be applied mutatis mutandis also to the proposed method and vice versa.

BRIEF DESCRIPTION OF THE DRAWINGS

The invention will now be explained in greater detail based on the appended drawing, the figures of which show as follows.

DETAILED DESCRIPTION

Figure 1:
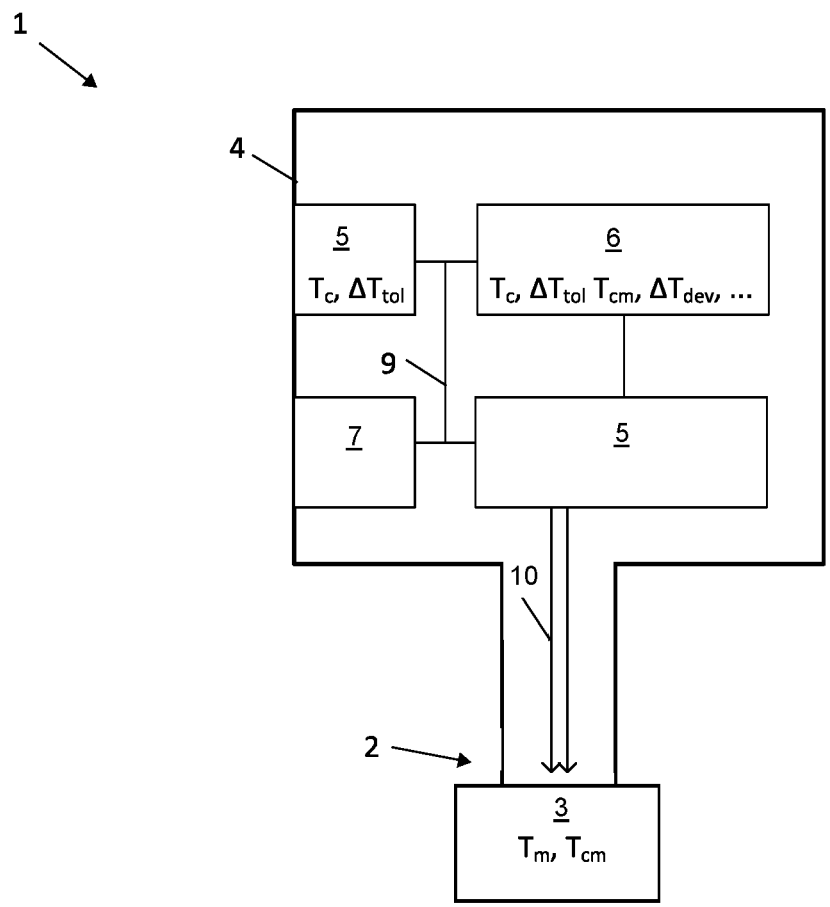
FIG. 1 shows a schematic view of an apparatus of the invention.

FIG. 1 shows a schematic view of a thermometer 1 of the invention. Thermometer 1 includes a temperature sensor 2 having at least one sensor element 3, by means of which a temperature $T_m$ of a medium can be ascertained. In such case, involved can be, for example, a resistance element or a thermocouple. The present invention is, however, not limited to a special thermometer type, but, instead, is applicable for a large number of thermometers. Sensor element 3 is connected by means of at least two connection cables 10 with an electronics unit 4. This is often also referred to as a transmitter. The electronics unit 4 includes an input unit 5, into which at least one comparison temperature $T_c$ of at least one comparison medium and/or a tolerance range $\Delta T_{tol}$ can be input by operating personnel. Furthermore, the electronics unit 4 includes a memory unit 6, in which, among other things, the comparison temperature $T_c$ and/or the tolerance range $\Delta T_{tol}$ can be stored. In this embodiment, the electronics unit 4 includes a separate computing unit 8, by means of which the electronics unit 4 can ascertain the measured value for the temperature $T_m$ of the medium or the comparison temperature measured value $T_{cm}$ of the utilized comparison medium. In such case, the electronics unit 4 is able to detect whether at a certain point in time a comparison measurement is being performed or not. In this regard, for example, at least one algorithm is furnished in the electronics unit 4, especially in the memory unit 6.

Moreover, the electronics unit 4 includes a display unit 7, by means of which at least the performing of a comparison measurement can be displayed. The input unit 5, the memory unit 6, the display unit 7 as well as the computing unit 8 are connected with one another within the electronics unit by means of connecting lines 9. Preferably, the display unit 7 comprises a digital interface, so that measurement data can be read-out from the memory unit 6. In such case, advantageously stored within the memory unit 6 within the electronics unit 4 for a comparison measurement are the comparison temperature $T_c$, in given cases, the tolerance range $\Delta T_{tol}$, the particularly ascertained temperature comparison measured value $T_{cm}$, the deviation $\Delta T_{dev}$ between $T_{cm}$ and $T_c$, and, in case an operation hours counter or a real time are present, the point in time of the comparison measurement. In this way, a calibration protocol can be furnished for each comparison measurement, which is performed.

Figure 2:
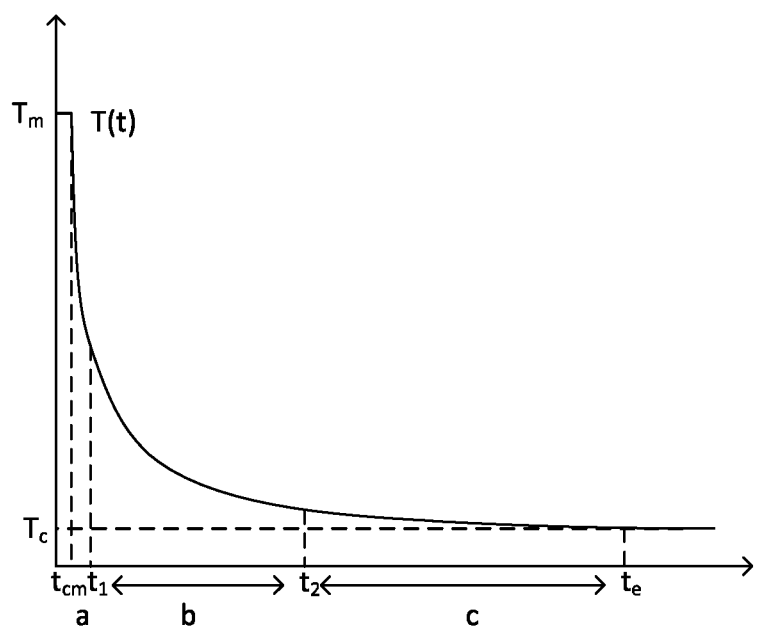
FIG. 2 shows a schematic presentation of a temperature curve.

In order based on an algorithm to detect whether a comparison measurement is being performed, for example, the temperature ascertained by means of the temperature sensor 2 can be plotted as a function of time in the form of a temperature curve T(t) and considered. Such a temperature curve T(t) is shown schematically in FIG. 2. It is, in such case, advantageous to choose a comparison medium, whose characteristic temperature point, which is taken into consideration as comparison temperature $T_c$, lies clearly outside of the working range of the thermometer 1, thus outside of the temperature range relevant for the thermometer 1. This case is shown in FIG. 2. At point in time $t_{cm}$, the thermometer 1, which earlier was at the temperature $T_m$, is immersed into the comparison medium with the comparison temperature $T_c$. In such case, the temperature curve T(t) can be divided roughly into three regions a, b and c. In the first seconds (region a), or fractions of a second, there occurs an abrupt temperature change in the direction of the comparison temperature $T_c$, followed by a somewhat flatter curve (region b) moving in the same direction. After a certain minimum difference between the comparison temperature $T_c$ and the current comparison temperature measured value $T_{cm}(t_2)$ (region c), the comparison temperature measured value $T_{cm}(t)$ moves then asymptotically within a certain tolerance interval toward the comparison temperature $T_c$. In principle, each section a, b, c of the temperature curve T(t) can be taken into consideration for detecting the performing of a comparison measurement. To this end, then, for example, a slope of the temperature curve T(t), or a section of the temperature curve T(t), the time $\Delta t$ required for reaching a stable comparison temperature measured value $T_{cm}$, or a temperature gradient can be ascertained. Especially simple is the definition of a minimum expected temperature jump $\Delta T_{min}$. If this is abruptly exceeded in the comparison of two sequentially taken comparison temperature measured values, then it can be concluded that the temperature sensor 2 has been immersed into a comparison medium.

Figure 3:
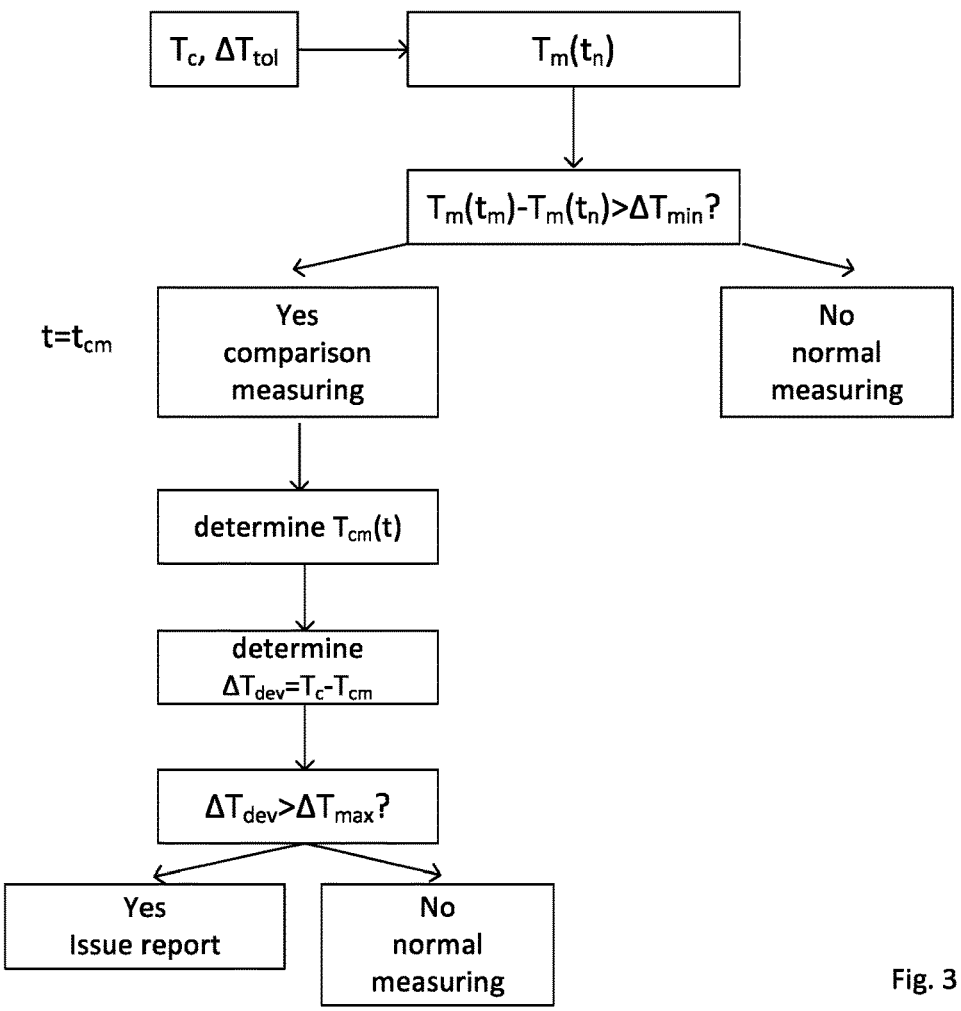
FIG. 3 shows a block diagram of a variant of the method of the invention.

FIG. 3 shows a possible method running within the electronics unit, by means of which it is detected whether a comparison measurement is taking place, and the comparison measurement is being performed. Of course, this embodiment is by way of example. Any of the method steps and applied decision criteria can be modified.

Via the input unit 5, a value for the comparison temperature $T_c$ and/or a tolerance range $\Delta T_{tol}$ is input for the memory unit of the electronics unit. The electronics unit determines during normal measuring continuously, or in predeterminable time intervals, the temperature of the medium $T_m(t)$ and calculates for two points in time $t_n$ and $t_m$, one following the other, in each case, the temperature difference $\Delta t = T_m(t_m) - T_m(t_n)$. If this exceeds a predeterminable minimum limit value $\Delta T_{min}$, the minimum temperature change, then the temperature sensor 2 is immersed in a comparison medium and a comparison measurement must be performed. In such case, the comparison temperature measured value $T_{cm}$ is determined by means of the temperature sensor 2 and the deviation $\Delta T_{dev} = T_c - T_{cm}$ ascertained. If the deviation exceeds, for example, a predeterminable limit value $\Delta T_{max}$, then a report that the temperature sensor 2 is no longer working correctly is generated.

Figure 4:
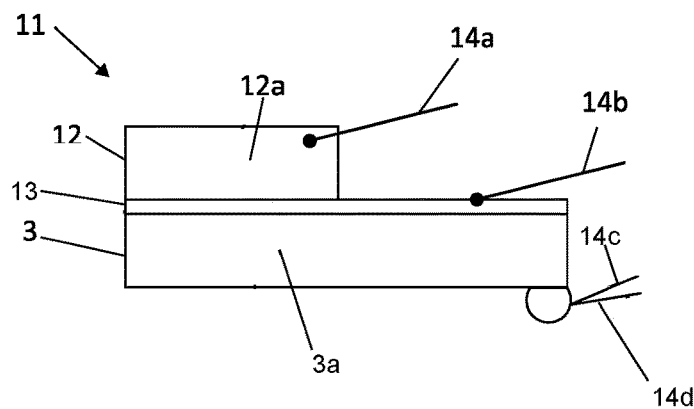
FIG. 4 shows an apparatus of the invention with a reference element.

Finally, FIG. 4 shows a temperature sensor 11 with a sensor element 3 and a reference element 12. Reference element 12 includes a material, which has at least one second order phase transition at a predetermined temperature, similarly to the case described in DE102010040039A1 (U.S. Pat. No. 9,091,601), whose disclosure is incorporated here by reference.

In the example of an embodiment shown here, sensor element 3 and reference element 12 are each on ceramic substrates 2a, 12a. The ceramic substrate 12a of the reference element is, on the one hand, coated from the upper face with an electrically conductive layer and contacted by means of a first wire 14a. Furthermore, sensor element 3 and reference element 12 are connected with one another and thermally coupled along the lower face A of the reference element 12 and along the upper face A' of the sensor element 3 via the metallizing 13, especially via a solder- or sinter process. The second contacting of the reference element 12 occurs via a second wire 14b attached to the metallizing 13. The sensor element 3 is, in turn, contacted via the two wires 14c, 14d.

If a temperature sensor 11 with a reference element 12, such as shown by way of example in FIG. 4, is used, then the electronics unit 4 is preferably embodied to perform a reference measurement. In this regard, for example, at least one value for the particular reference temperature $T_{ref}$ can be furnished within the memory unit 6. The reference measurement can then occur analogously to the comparison measurement, in that the temperature sensor, for example, is immersed first in a first medium with a first temperature $T_1 < T_{ref}$ and then in a second medium with a second temperature $T_2 > T_{ref}$. In such case, at least the temperature measured values $T_m(t)$ ascertained by means of the reference element 12 in defined time intervals are plotted as a function of time, as well as the change of a referenced physical or chemical variable $R(t)$ accompanying the phase transition as a function of time. Then, based on the characteristic change of the physical or chemical variable at the occurrence of the phase transition, a reference point in time $t_{ref}$ can be determined, and the deviation $\Delta T_{ref}$ of the temperature measured value $T_m(t_{ref})$ from the reference temperature $T_{ref}$ determined.

The invention claimed is:

1. An apparatus for determining and monitoring a temperature of a process medium, comprising:
a temperature sensor including a sensor element; and
an electronics unit including an input unit and a display unit,
wherein the input unit is configured for an input of an expected comparison temperature of a comparison medium,
wherein the electronics unit further includes an algorithm configured to detect whether the temperature sensor is immersed in the comparison medium,
wherein the electronics unit is embodied, based on the algorithm, to:
determine and monitor the temperature of the temperature sensor as a function of time and thereby produce a temperature curve,
detect whether the temperature sensor is removed from the process medium and immersed in the comparison medium at the expected comparison temperature by detecting an abrupt change in the monitored temperature as shown in the temperature curve, wherein the expected comparison temperature of the comparison medium lies outside a range relevant to the process medium, and wherein the abrupt change is greater than a predetermined minimum change and is in a direction from the temperature of the process medium to the expected comparison temperature,
perform a comparison measurement for calibrating and validating the sensor element when the electronics unit detects the temperature sensor is immersed in the comparison medium, and
determine a temperature of the comparison medium in the form of a comparison temperature measured value based on a received signal from the sensor element when the temperature sensor is immersed in the comparison medium, and
wherein the display unit is configured to indicate the performing of the comparison measurement and/or the comparison temperature measured value.

2. The apparatus as claimed in claim 1, further comprising:
a memory unit in which the expected comparison temperature and the comparison temperature measured value are storable.

3. The apparatus as claimed in claim 1, wherein the display unit includes an optical interface including an LED, a display, or a digital interface.

4. The apparatus as claimed in claim 1, wherein the electronics unit is further embodied to ascertain a deviation of the comparison temperature measured value from the expected comparison temperature, and when the deviation exceeds a predetermined limit value, to generate a report of the deviation and/or to indicate the deviation using the display unit and/or to furnish the deviation to the memory unit.

5. The apparatus as claimed in claim 1,
wherein the input unit is further configured for an input of a tolerance range for the comparison temperature,
wherein the electronics unit is further embodied to generate a report of the comparison temperature measured value and/or to indicate the comparison temperature measured value using the display unit when the comparison temperature measured value differs from the expected comparison temperature by more than the tolerance range.

6. The apparatus as claimed in claim 1,
wherein the temperature sensor further includes a reference element embodied as a capacitor, the capacitor including a dielectric embodied of a ferroelectric material that undergoes a second order phase transition at a predetermined reference temperature, wherein the second order phase transition effects a change in a dielectric constant of the ferroelectric material at the predetermined reference temperature, wherein the electronic unit further includes a capacitance measurement circuit embodied to measure a capacitance of the reference element capacitor and further embodied to detect the change in the dielectric constant of the ferroelectric material via a change in the capacitance of the reference element capacitor, and wherein the electronics unit is further embodied to perform a reference temperature measurement using the reference element when the temperature sensor is immersed in a first medium having a first temperature less than the predetermined reference temperature and the temperature sensor is subsequently immersed in a second medium having a second temperature greater than the predetermined reference temperature and the second order phase transition is detected via the detection of the change in the capacitance.

7. The apparatus as claimed in claim 6, wherein the reference element and the sensor element are arranged on at least one or at least two ceramic substrates metallized in the region of at least one face and thermally coupled via the metallizing and connected via a solder or sinter process.

8. A method for calibrating and/or validating a temperature-monitoring apparatus, the method comprising:
   providing the temperature-monitoring apparatus, including;
      a temperature sensor including a sensor element; and
      an electronics unit including an input unit and a display unit,
         wherein the input unit is configured for an input of an expected comparison temperature of a comparison medium,
         wherein the electronics unit further includes an algorithm configured to detect whether the temperature sensor is immersed in the comparison medium,
         wherein the electronics unit is embodied, based on the algorithm, to:
            determine and monitor a temperature of the temperature sensor as a function of time and thereby product a temperature curve,
            detect whether the temperature sensor is removed from a process medium and immersed in the comparison medium at the expected comparison temperature,
            perform a comparison measurement for calibrating and validating the sensor element when the electronics unit detects the temperature sensor is immersed in the comparison medium, and
            determine a temperature of the comparison medium in the form of a comparison temperature measured value based on a received signal from the sensor element when the temperature sensor is immersed in the comparison medium, and
         wherein the display unit is configured to indicate the performing of the comparison measurement and/or the comparison temperature measured value;
   monitoring the temperature of the temperature sensor as a function of time,
   detecting whether the temperature sensor is immersed in the comparison medium by detecting an abrupt change in the monitored temperature as shown in the temperature curve, wherein the expected comparison temperature of the comparison medium lies outside a range relevant to the process medium and wherein the abrupt change is greater than a predetermined minimum change and is in a direction from a temperature of the process medium to the expected comparison temperature;
   performing a comparison measurement when the electronics unit of the temperature-monitoring apparatus detects the temperature sensor is immersed in the comparison medium;
   determining a temperature of the comparison medium in the form of a comparison temperature measured value; and
   displaying the performing of a comparison measurement.

9. The method as claimed in claim 8, further comprising:
   storing the expected comparison temperature of the comparison medium and a tolerance range for the comparison temperature.

10. The method as claimed in claim 8, further comprising:
   determining the comparison temperature measured value in predetermined time intervals;
   plotting as a function of time in the form of a temperature curve the determined comparison temperature measured values; and
   determining in reference to the predetermined time interval a slope of at least a section of the temperature curve, the time required for reaching a stable comparison temperature measured value, or a temperature gradient.

11. The method as claimed in claim 9, further comprising:
   determining a deviation of the comparison temperature measured value from the expected comparison temperature.

12. The method as claimed in claim 11, further comprising:
   generating a report when the deviation exceeds a predetermined limit value and/or when the comparison temperature measured value lies outside of the at least one tolerance range.

13. A method for determining a reference temperature of a temperature-monitoring apparatus, the method comprising:
   providing the temperature-monitoring apparatus, including:
      a temperature sensor including:
         a sensor element; and
         a reference element embodied as a capacitor, the capacitor including a dielectric embodied of a ferroelectric material that undergoes a second order phase transition at a predetermined reference temperature, wherein the second order phase transition effects a change in a dielectric constant of the ferroelectric material at the predetermined reference temperature; and
      an electronics unit including an input unit, a capacitance measurement circuit embodied to measure a capacitance of the reference element capacitor, and a display unit,
         wherein the input unit is configured for an input of an expected comparison temperature of a comparison medium,
         wherein the electronics unit further includes an algorithm configured to detect whether the temperature sensor is immersed in the comparison medium and to monitor the capacitance of the reference element,
         wherein the electronics unit is embodied, based on the algorithm, to:
            determine and monitor a temperature of the temperature sensor as a function of time and thereby produce a temperature curve, detect whether the temperature sensor is removed from a process medium and immersed in the comparison medium at the expected comparison temperature, perform a comparison measurement for calibrating and validating the sensor element when the electronics unit detects the temperature sensor is immersed in the comparison medium, determine a temperature of the comparison medium in the form of a comparison temperature measured value based on a received signal from the sensor element when the temperature sensor is immersed in the comparison medium, and perform a reference measurement using the reference element when the second order phase transition is detected via a detection in a change in the capacitance of the reference element, wherein the display unit is configured to indicate the performing of the comparison measurement and/or the comparison temperature measured value;

immersing the temperature sensor in a first medium having a first temperature below the predetermined reference temperature;

immersing the temperature sensor in a second medium having a second temperature above the predetermined reference temperature;

registering in defined time intervals temperature measured values as a function of time ascertained using the temperature sensor and thereby produce a temperature curve;

registering, as a function of time, the capacitance of the reference element and thereby produce a capacitance curve;

ascertaining a reference point in time at which the second order phase transition of the ferroelectric material of the dielectric takes place, based on a characteristic change of the capacitance as shown in the capacitance curve; and determining a deviation of the temperature measured value from the predetermined reference temperature at the reference point in time.

\* \* \* \* \*